United States Patent [19]
Hall Taylor

[11] Patent Number: 5,948,209
[45] Date of Patent: Sep. 7, 1999

[54] STRIPPING OF VOLATILE SUBSTANCES FROM LESS VOLATILE FLUIDS

[75] Inventor: Nicholas S. Hall Taylor, Cranbrook, United Kingdom

[73] Assignee: Crown Chemtech Limited

[21] Appl. No.: 08/585,254

[22] Filed: Apr. 14, 1995

[30] Foreign Application Priority Data

Apr. 15, 1994 [GB] United Kingdom .................. 9407504

[51] Int. Cl.⁶ .............................. B01D 1/16; B01D 47/00; C07C 51/573
[52] U.S. Cl. .......................... 159/4.4; 554/175; 554/205; 261/DIG. 56
[58] Field of Search ................................... 554/175, 205; 159/4.4; 261/DIG. 56

[56] References Cited

FOREIGN PATENT DOCUMENTS

| | | |
|---|---|---|
| 1205776 | 9/1970 | United Kingdom . |
| 1330899 | 9/1973 | United Kingdom . |
| 1337049 | 11/1973 | United Kingdom . |
| 1400836 | 7/1975 | United Kingdom . |
| 1446831 | 8/1976 | United Kingdom . |
| 1466515 | 3/1977 | United Kingdom . |

OTHER PUBLICATIONS

Vernon Young, *Chemistry and Industry*, "Processing of Oils and Fats", 1978, pp. 692–703.

*Primary Examiner*—Paul J. Killos
*Assistant Examiner*—Jafar Parsa
*Attorney, Agent, or Firm*—Nawrocki, Rooney & Sivertson, P.A.

[57] ABSTRACT

Stripping of volatile substances from less volatile fluids as in the deodorisation and steam refining of fats and oils in an elongate conduit (1) in which the rate of flow of stripping gas is accelerated by having it emerge from a constriction (5;18) to which an inlet (6;20) for liquid feed material is operatively connected is achieved by having the path for food material downstream of the constriction (5;18) provided at intervals with inclined baffle surfaces (8) extended in the flow direction of the path across part of the cross-section thereof to project back into the gas within the path liquid film which has accumulated on the wall of the path.

7 Claims, 2 Drawing Sheets

STRIPPING OF VOLATILE SUBSTANCES FROM LESS VOLATILE FLUIDS

This invention relates to a method and apparatus for the stripping of volatile substances from less volatile fluids and in particular relates to the deodorization and steam refining of fats and oils.

Oils and fats are natural products whose impurity levels will vary not only with oil type but also with weather, soil, harvesting, feed storage and extraction conditions. Oils refining can be considered to start in the crude oil storage tank where there is gravity separation of oil insoluble material. Purification of the oils and fats then involves a number of stages some of which are optional depending on the quality of the oil supplied and all of which begin with degumming to remove phospholipids, sugars, resins and proteinaceous compounds, trace metals and others and culminate in a deodorisation step to remove volatile substances including fatty acids, mono- and diglycerides, aldehydes and ketones, hydrocarbons and pigment decomposition products.

Traditionally deodorization has involved steam distillation under vacuum. The effectiveness of the process depends on a combination of factors including the intimacy of mixing of steam and oil and the vacuum and temperature employed. It is a process very much concerned with efficiency—for instance, energy saving by heat exchange, reduction of steam usage, both for stripping and vacuum, baffling to prevent the loss of neutral oil entrained in distillate vapour, the loss of of product due to saponification of triglycerides.

The basic conditions of deodorization, that is vacuum, temperature and stripping steam usage are the same for continuous deodorizers as for batch or semicontinuous units. In recent years, design developments have concentrated on oil/stripping steam contact improvement. High dispersion efficiency permits plant size reduction with consequent lowering of cost and also reduces the length of time for which the oil must be held on peak temperature. In this connection, where batch deodorization processes are concerned, it is desirable to reduce the mass ratio of steam to oil as much as possible thereby reducing energy input. A steam: oil mass ratio of 1:10, preferably 1:20 is generally aimed at. Optimally however, a ratio approaching 1:50 is to be aimed at. Thus to work with such a ratio, it is necessary to optimize the time of residence of the droplets in the gas phase and maximize the surface area for improved mass transfer.

One technique which has been developed in this respect is to atomise the oil as it is supplied into a continuous steam phase under vacuum conditions. The mixture passes through a high turbulence contactor in which volatile constituents of the oils are taken up in the steam phase which is separated from the oil phase in a cyclone separator under vacuum or using thin film evaporator techniques. Such a method of working is disclosed for example in British Patent Specification No. 1205776 which provides for the mixture of volatilized oil and steam to pass along a tortuous path having a surface configuration that induces high turbulence thereby forming a homogeneous mixture of gas, oil and volatiles stripped from the oil, while increasing the velocity of movement of the mixture by expansion of the steam. Techniques hitherto devised have not been able to achieve use of steam:oil mass ratios significantly better than 1:20.

It is an object of the invention to increase the efficiency of steam/oil contacting in a procedure of the aforesaid type for deodorising oils and fats in particular, thereby to reduce significantly the amount of steam employed while maximizing the time of residence of oil droplets in the gaseous phase concomitant with achieving maximum surface area for improved mass transfer.

According to one aspect of the present invention, there is provided a stripping apparatus having an elongate conduit for conveying gas, a constriction provided in said conduit for increasing the rate of flow of gas emerging from the constriction, an inlet for liquid feed material operatively connected to said constriction for minutely fragmenting feed material into particles in the gas as the gas emerges from the constriction to form a homogeneous gas/liquid admixture, an elongate walled path connected to said conduit for providing impact surfaces for said particles to fracture them and to present new material surfaces to the gas to maintain a continuous high degree of volatilization of volatiles from the material and separator means at a portion of said path remote from the position of connection of said conduit and the walled path for separating the stripped material residue from the gas containing volatile substances, characterized in that the wall of said path is provided at intervals with inclined baffle surfaces extending in the flow direction of the path across part of the cross-section of the path to project back into the gas within the path liquid film which has accumulated on the wall of the path.

According to another aspect of the invention, there is provided a method of stripping volatile substances from liquid feed material which comprises supplying the liquid feed material to a constricted flow of a gas, causing turbulence to occur in the gas thereby to atomise the liquid feed material therein, and increase the surface area of liquid feed material at which transfer from the liquid feed material of volatile substances therein into the gas takes place, atomised droplets of the liquid feed material collecting on a wall surface surrounding the gas being returned to the flow of liquid feed material within the gas by baffle means inclined in the direction of flow of the gas, and, at a position remote from that at which said turbulence occurs, effecting liquid/gas separation to separate from the liquid feed material, the gas with volatile substances from the liquid entrained therein.

By providing for reentrainment of oil, as the liquid feed material, in the gas, particulating steam, continuing to flow through the path, further exposure of oil to the gas for stripping of volatiles is achieved in a single pass along a path as aforesaid while utilizing for such purpose a single supply of stripping gas in a relatively low steam to oil ratio. Such procedure is significantly more energy efficient than a multi-pass technique previously employed in which a battery of stripping apparatus stages would be required, with there being a fresh supply of steam to each stage of the stripping apparatus into which the oil would all need to be atomised anew.

The desired reduction in the steam to oil ratio concomitant with maintaining a high enough steam velocity at the constriction to achieve effective atomization is obtained particularly effectively if there is injection of the feed material into the gas conduit at the constriction. Although it is possible to have the flow of gas to which the liquid feed material is supplied be under a vacuum, this need not be so especially when, as in preferred practice, gas flow under a sonic velocity takes place as the gas emerges from the constriction. The velocity may be regulated by the up-stream steam pressure and can result in a slightly superatmospheric pressure when the constriction has widened out into a nozzle throat. By operating in this manner, the steam flow is uncoupled from the vacuum to which the gas flow is subject downstream of the nozzle.

With a stripping apparatus embodying this invention, it is preferred that the path be essentially vertical. Horizontal flow would provide less flow symmetry. To increase the length of the path, it is conceivable that the path itself be sinuous with there being U-bends between each limb of the path. It is possible for there to be tapping off points for the deodorised oil which results at one or more resulting U-bends so that energy saving can be achieved with relatively pure feed oils by removing the oil from the walled path at a relatively early stage when purification to a required extent will have been achieved already. Less pure feed oils will be required to travel a further distance through the walled path, thereby requiring greater energy input, especially if, as is preferred, oil jacketing of the straight parts of the walled path is being utilized for achieving heat transfer to maintain the oil within the wall path at the optimum temperature for stripping of volatiles.

In general, it is desirable to remove as much as possible of the oil that accumulates at the lower surface of a U-bend, in particular the final U-bend of a stripping apparatus embodying this invention.

As an alternative or additional feature to the jacketing, provision may be made for injection of additional steam at the reentrainment positions. The injection position should be such that oil on the underside of the baffles is contacted by the steam as it leaves the baffles.

Condensed vapour itself may be removed from the system at the underside of inverted U-bends with the preferred vertical path system including a sequence of U-bends. Separation in such manner has the advantage of obviating phase separation methods which have been needed with prior art systems such as described in British Patent Specification No. 1 205 776 and reduces the extent of phase separation required at the end of the vertical path system.

Oil removal is enhanced by incorporating a section of sintered material in the apparatus, either as part of the wall of the path or preferably by inclusion in an outlet duct from the path at such U-bend. Controlled removal of oil from the path is then readily achieved by application of suction to the sintered material. With any such U-bend located oil removal means, but particularly effectively with such preferred sintered section therein, it is possible to reduce the load on the separator unit which is required at the end of the path. This in turn will result in a decrease in size of separator and more importantly of the vacuum set for the path leading in turn to a further reduction in steam consumption.

BRIEF DESCRIPTION OF THE DRAWINGS

For a better understanding of the invention, and to show how the same may be carried into effect, reference will now be made, by way of example only, to the accompanying drawings, wherein:

The apparatus shown in FIG. 1 for stripping of volatile constituents from a less volatile liquid, in particular an edible oil or fat, comprises an elongate conduit 1 of sinuous form including an inverted U-bend 2 and a "conventional" U-bend 3, and commences with an inlet section 4 into which steam is admitted. A short distance down the inlet section 4 is provided a section of conduit 1 in which there is a constriction 5 at which oil is to be supplied through an inlet 6. The conduit 1 leads to a separator 7 in which oil/liquid separation is to take place. Positioned at intervals along the sinuous conduit 1 are baffles 8 inclined in the feed direction of fluid through the conduit. Steam nozzles 9, of which only one is shown, are provided so as to enable additional steam to be injected into the fluid flow in the conduit 1 on the underside (up-stream) side of the baffles. Finally, FIG. 1 shows an outlet duct 10 with valve 11 provided at the underside of U-bend 3 for intermediate take-off of oil, should such oil have reached a satisfactory degree of purity by the time it has reached U-bend 3.

The sinuous conduit 1 will generally be formed of a plurality of pipe sections of which one section 12 shown in detail "A" of FIG. 1 is shown to an enlarged scale in FIG. 2 of the drawings. These sections have flanged ends 13 and 14 provided with openings 15 at which bolt connections can be formed between the flanges of adjacent pipe sections. The flange 13 is located at the forward end of pipe section 13 in the mouth of which is located a baffle 8 whose inclination to the pipe wall is shown to be approximately 30°, but can typically be for from 15 to 75°, more particularly 20 to 45°. By constructing the conduit 1 from pipe sections in one end of which baffles can readily be provided, it becomes readily possible to provide a conduit having baffles at regular intervals. FIG. 2 also shows a pipe socket 16 through which can be passed a steam nozzle for injection of additional steam. If such steam nozzle is not employed, then the socket will either be absent or closed off.

Figure 1:
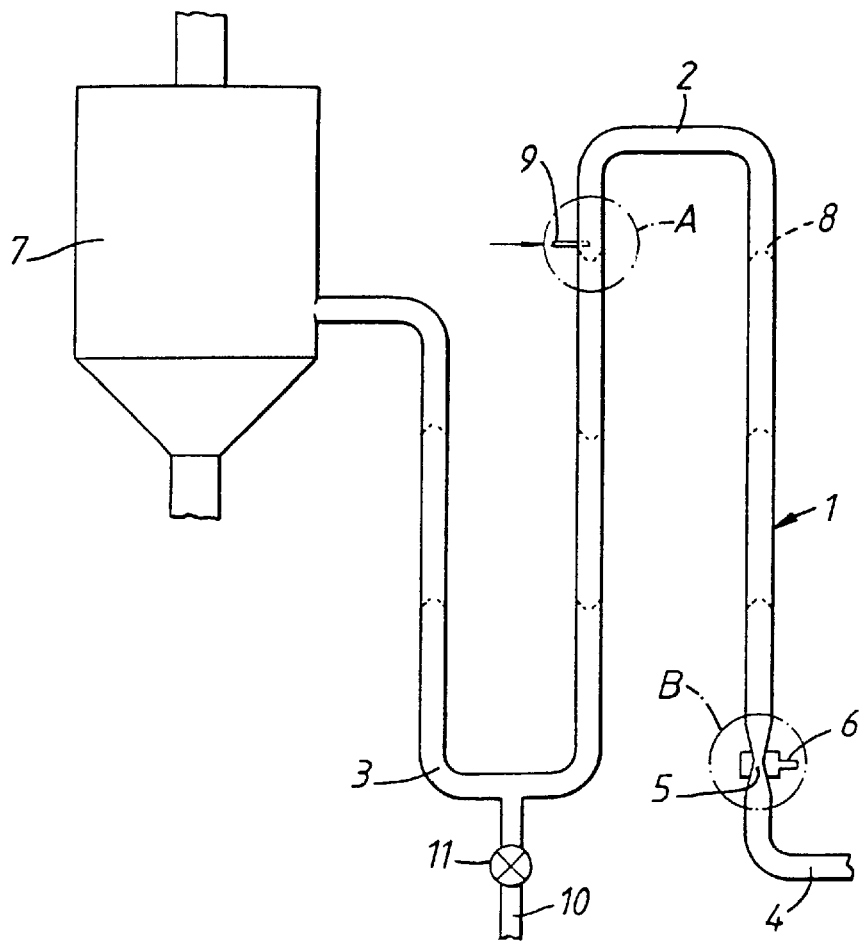
FIG. 1 shows schematically apparatus for the stripping of volatile substances from less volatile fluids, embodying this invention.
Figure 3:
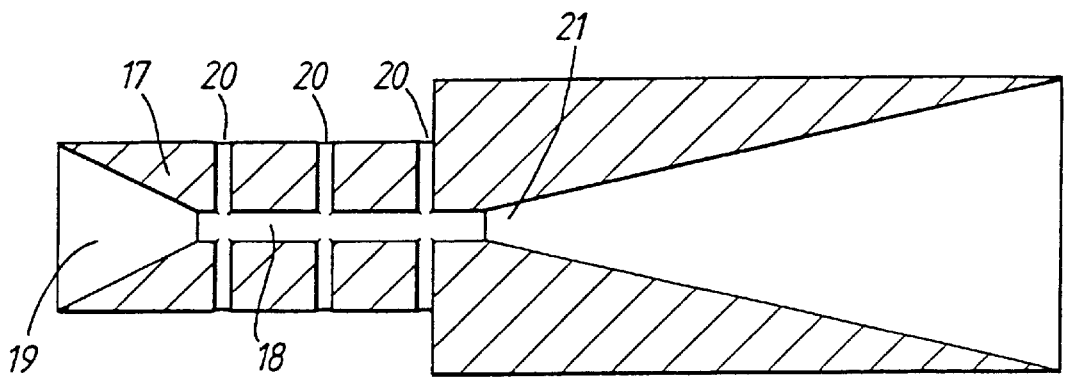
FIG. 3 shows to an enlarged scale detail "B" of FIG. 1 in a preferred construction thereof.
Figure 2:
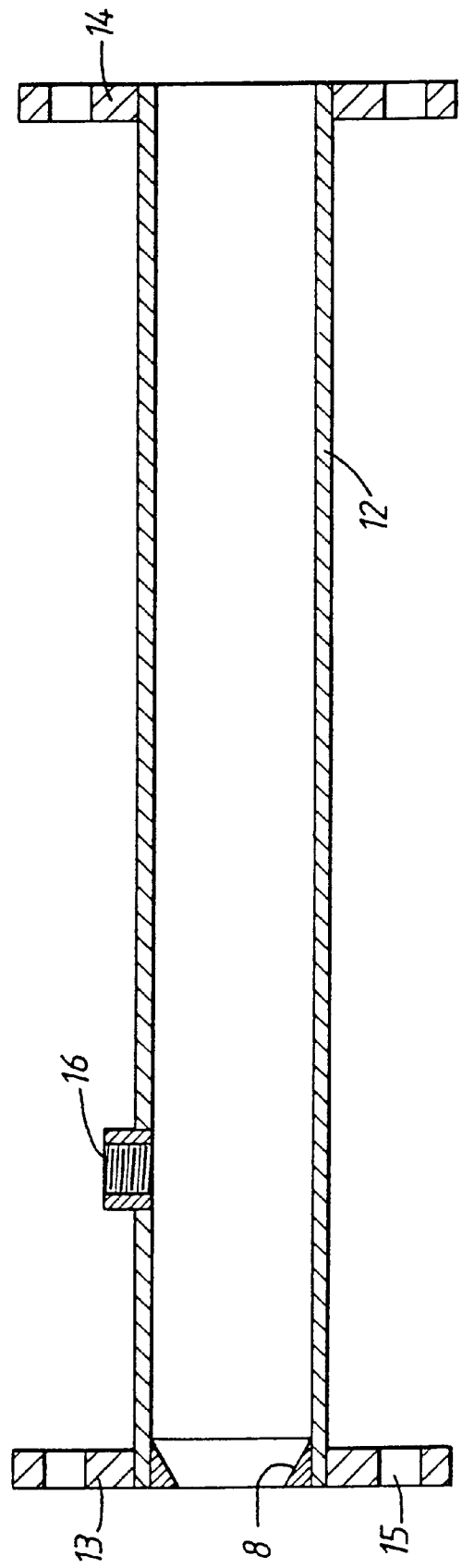
FIG. 2 shows to an enlarged scale detail "A" of FIG. 1.

Referring finally to FIG. 3, there is he schematically and to an enlarged scale the detail "B" shown in FIG. 1. Although generally there may be a single slot in the conduit wall at the position of the constriction 5 for introduction of oil to the flow of steam, shown here is a solid block 17 for insertion in conduit 1 adjacent a wall opening (not shown) for supply of oil. Block 17 has a narrow opening or constriction 18 therethrough and conical opening 19 for steam into the constriction 18. A plurality of slots 20 is provided for dividing up oil flow to conduit 1 before it even reaches constriction 18. This enhances distribution of oil in the steam prior to break up of the oil into droplets as the steam leaves constriction 18 in a state of turbulence brought about by the provision of the conical nozzle 21 constituted by the opening out of the through passage through the block 17.

The apparatus of FIG. 1 is utilized in effecting removal of volatiles from oil in the following manner. Steam is admitted to conduit 1 at inlet 4. At the same time, oil to have its volatiles content substantially removed, is injected through oil inlet 6 into the interior of the conduit 1 at constriction 5. As a result of the turbulence imposed upon the steam as it leaves constriction 5, the oil becomes finely divided thereby enhancing oil/steam contact as flow thereof takes place through conduit 1. There will be a spray effect produced at the downstream side of nozzle 5 and fluid in the centre will travel furthest through the conduit before making any contact with the interior wall thereof. Generally wall contact will take place as oil droplets lose velocity. A thin film of oil with a content of volatile substances which will decrease with location down the conduit 1 will form on the interior wall of the conduit. By provision of baffles 8, the film of oil will flow over the baffles to be returned to the central position in the conduit preferred for through-flow and break up of the oil film under the action of the central flow of steam of greatest velocity. Nevertheless, the steam velocity may be enhanced from time to time by injection of additional steam through nozzles 9 on the upstream side of the baffles thereby to accelerate the flow of steam through the baffles and at the same time to provide additional heat input to the system for enhancing the removal of volatiles from then oil droplets on contact thereof with the steam. Eventually oil and steam will reach separator 7 where phase separation takes place to enable oil largely free of volatiles to be removed at the bottom and steam carrying the volatiles to be removed at the top.

The basic system of FIG. 1 whose operation has thus been described may be modified in a number of ways. Thus the arrangement of constriction 5 and its associated oil inlet 6 may be modified as shown in FIG. 3 to achieve enhanced oil distribution in the steam prior to atomization in the steam on emergence from block 17. The divided introduction of oil at say three injection points, as shown, results in reduction in the steam/oil ratio. The reduction will not necessarily be by a factor of 3 with three injection points, but will still be significant. This is because, once the liquid entering from the one injection point is atomized, the liquid entering at the next injection point encounters essentially the same amount of steam but containing some droplets from the previous injection point(s), and so on. The number of injection points has to be limited because the steam loses momentum each time it has to atomise and accelerate the droplets.

At the underside of U-Bend 3, by opening valve 11, it is possible to remove accumulating oil flow at U-bend 3 from the conduit, obviating the need for use of separator 7 if the purity of the oil by the time it has reached U-bend 3 is sufficient for future use. Withdrawal of the oil at this position may be assisted by incorporating in place of valve 11 a sintered section and then applying a vacuum to withdraw the liquid by suction. This practice may be carried when nevertheless a separator 7 is to be employed for effecting steam/oil separation. By removing adequately purified oil at U-bend 3, a smaller separator 7 than otherwise can be employed and hence there can be a reduction in the vacuum which is to be present in conduit 1 throughout operation and hence overall a reduction in steam consumption.

I claim:

1. A stripping apparatus having an elongate conduit for conveying gas, a constriction provided in said conduit for increasing the rate of flow of gas emerging from the constriction, an inlet for liquid feed material operatively connected to said constriction for minutely fragmenting feed material into particles in the gas as the gas emerges from the constriction to form a homogeneous gas/liquid admixture, an elongate walled path comprised by said conduit providing impact surfaces for said particles to fracture them and to present new material surfaces to the gas to maintain a continuous high degree of volatilization of volatiles from the material and separator means at a portion of said path remote from the position of connection of said conduit and the walled path for separating the stripped material residue from the gas containing volatile substances, characterized in that the wall of said path is provided at intervals with inclined baffle surfaces extending in the flow direction of the path across part of the cross-section of the path to project back into the gas within the path liquid film which has accumulated on the wall of the path.

2. A stripping apparatus as claimed in claim 1, in which the inlet for liquid feed material and the constriction are operatively connected for injection of the feed material into the conduit at the constriction.

3. A stripping apparatus as claimed in claim 1, wherein the conduit extends essentially vertically from the constriction.

4. A stripping apparatus as claimed in claim 1, comprising a sinuous walled path comprising a plurality of essentially vertical limbs joined by U-bends.

5. A stripping apparatus as claimed in claim 4, having stripped feed material removal means at at least one U-bend.

6. A stripping apparatus as claimed in claim 1, additionally comprising gas injection means positioned to inject further said gas towards the upstream side of the baffle surfaces.

7. A stripping apparatus as claimed in claim 1, wherein the baffle surfaces (8) are inclined to the path wall at 20–45°.

* * * * *